United States Patent Office 3,378,578
Patented Apr. 16, 1968

3,378,578
PROCESS OF PREPARING ARALKYL ESTERS
Edward S. Blake, Dayton, Ohio, assignor to Monsanto Research Corporation, St. Louis, Mo., a corporation of Delaware
No Drawing. Filed Aug. 28, 1964, Ser. No. 392,938
5 Claims. (Cl. 260—476)

ABSTRACT OF THE DISCLOSURE

The method of preparing a β,β-dimethylphenethyl ester by reaction of benzene and a methallyl ester in the presence of anhydrous aluminum chloride.

---

This invention relates to aralkyl oxygenated organic compounds and more particularly provides a new and valuable method of preparing β,β-dimethylphenethyl esters and β,β-dimethylphenethyl alcohol.

In my copending application Ser. No. 333,190, filed Dec. 24, 1963, there are disclosed and claimed diesters of β,β-dimethylphenethyl alcohol and alkanedicarboxylic acids, which diesters are of outstanding utility for functional fluid use. They are prepared by reaction of β,β-dimethylphenethyl alcohol and an appropriate alkanedicarboxylic acid or the acyl halide or anhydride thereof.

Although β,β-dimethylphenethyl alcohol has been known for many years, no means for producing it on a commercially feasible, large-scale basis has been provided. In each case, the reported method either required the use of difficultly available starting materials, or it resulted in impracticably low yields and tedious purifying procedures. Thus, in 1912, Haller, Comptes rendus 155 1583 (1912) reported preparation of the alcohol, B.P. 122–3° C./20 mm. by reduction of α-methylhydratropamide with sodium in absolute alcohol (see also Annales de Chemie (9) 9 10 (1918)). Darzens et al., Comptes rendus 189 1287 (1929), prepared the alcohol, M.P. 115–6° C./10 mm., by reduction of isoamyl α-methylhydratropate with sodium in isoamyl alcohol. More recently, Mndzhoyan et al., Doklady Akad. Nauk Armyan, S.S.R. 29 235–43 (1959), Chem. Abstracts 54 22476, report reduction of ethyl α-methylhydratropate to the alcohol, B.P. 92–3° C./1–5 mm., $n_D^{25}$ 1.5209, by means of lithium aluminum hydride. Reduction of α-methylhydratropic acid with lithium aluminum hydride in dry ether has been also reported by Robinson et al., Biochem. J., 59 159–61 (1955), who obtain the alcohol, B.P. 125° C./14–20 mm. Somerville et al., J. Amer. Chem. Soc., 72, 2186 (1950) report a very low yield of the alcohol, B.P. 77° C./3 mm., $n_D^{20}$ 1.5224 by reaction of isobutylene oxide with benzene in the presence of aluminum chloride. Tonomura et al. Bull. Inst. Phys. Chem. Research (Tokyo), 21 774–803 (1942), Chem. Abstracts, 41 5465 report that oxidation of tert.-butylbenzene proceeds with intermediate formation of the alcohol. Whitmore et al., J. Amer. Chem. Soc., 65, 1469 (1943), oxidized the Grignard reagent of (2-chloro-1,1-dimethylethyl)benzene to give the alcohol, 131° C./30 mm. $n_D^{20}$ 1.5261. Cadogan et al., J. Chem. Soc., 3074 (1961), passed oxygen through an ether solution of the same Grignard reagent to obtain the alcohol B.P. 110–112° C./12 mm., $n_D^{24}$ 1.548. Petrov et al., Zhur. Obschchei Khim., 30, 845–9 (1960), Chem. Abstracts, 55, 448i, report oxidation of the same Grignard reagent at 3–5° C. to give the alcohol, B.P. 115–7° C./20 mm., $n_D^{20}$ 1.5257. Starting with the (2-chloro-1,1-dimethylethyl)benzene, Haller et al., Comptes rendu, 174, 1212 (1922) and Annales de Chimie (9), 9, 14 (1918), reacted it with silver acetate to give α,α-dimethylphenethyl acetate and then saponified the latter to give the alcohol, B.P. 115°–17° C./15 mm., identified through its phenylurethane, M.P. 59° C. (see also Annales de Chimie (9), 9, 10 (1918)).

Neither α-methylhydratropic acid, $$C_6H_5C(CH_3)_2COOH$$

nor its amide or esters are readily available, and (2-chloro-1,1-dimethylethyl)benzene (neophyl chloride) is a laboratory curiosity whose reactions have been chiefly studied owing to the rearrangements of its structure which are frequently encountered in working with it. Although theoretically, hydrolysis of the esters should have provided an easy, technical means of obtaining the β,β-dimethylphenethyl alcohol, such a method, in fact, only placed the cart before the horse, since generally, the known esters, themselves, had been prepared by esterification of the alcohol (see, e.g., Darzens, loc. cit. and Wilt et al., J. Org. Chem., 23, 921 (1958), and from the (2-chloro-1,1-dimethylethylbenzene as mentioned above. Another prior art method used for making the acetate, involves only very low yields. Thus β,β-dimethylphenethyl methyl ketone which was obtained in a 61% yield by the Friedel-Crafts reaction of mesityl oxide with benzene in the presence of aluminum chloride was oxidized with peroxyfluoroacetic acid to give a 38.5% yield of the alcohol, based on the β,β-dimethylphenethyl methyl ketone (Wilt et al., loc. cit.).

The preparation of phenyl-substituted, low-molecular weight, oxygen-containing saturated aliphatic compounds by the Friedel-Crafts addition of benzene to a lower, olefinic oxygen-containing compound has generally been either unsuccessful or has resulted in low yields of addition product. The olefinic compound is readily polymerized and/or cracked by the metal halide catalyst before the benzene can add to the olefinic double bond. Thus, Korshak et al., J. Gen. Chem. U.S.S.R., 16, 1065–70 (1940), report that in the aluminum chloride-catalyzed reaction of vinyl acetate with benzene, no addition was evidenced; instead there were obtained cracking products such as acetophenone, 1,1-diphenylethane and 9,10-dimethyl-9,10-dihydroanthracene. Pepper et al., Can. J. Chem., 40, 122–7 (1962), report that the aluminum chloride catalyzed reaction of benzene with vinyl formate gave 9,10-dimethylanthracene, but no carbonyl-containing compounds: with vinyl acetate, there was obtained 1,1-diphenylethane, 9,10-dimethylanthracene, acetophenone and p-ethylacetophenone. Reduction was also observed by Tsukervanik et al., Zhur. Obschei Khim., 23, 1635–8 (1953), Chem. Abstracts, 48, 13665d, when they reacted allyl acetate with benzene in the presence of aluminum chloride. These workers report that under all conditions, the reaction yields up to 56% of the hydrocarbon, 1,2-diphenylpropane. Addition of benzene at the olefinic bond did occur, but there was also replacement of the acetyl group by the phenyl radical. In one run, when there was obtained a 38% yield of the 1,2-diphenylpropane from 15 g. of the allyl acetate, there was also obtained 3.4 g. of a material, B.P. 114–28° C./15 mm., which contained some 54% of the 1:1 addition product, β-methylphenethyl acetate, which was identified by saponification to β-methylphenethyl alcohol. The same 1.84 g. of β-methylphenethyl acetate thus obtained, representing less than a 10% theoretical yield, does not recommend a similar method for the production of esters of β,β-dimethylphenethyl alcohol.

I have found, however, that when certain esters of methallyl, rather than allyl, alcohol are reacted with benzene and the hereinafter defined conditions are employed, there are obtained very good yields of the corresponding β,β-dimethylphenethyl ester. The present invention provides a method which comprises contacting a methallyl ester selected from the class consisting of methallyl benzoate and methallyl acetate with benzene at a temperature of from −5° C. to 30° C. in the presence of an inert organic liquid diluent and of from 1.05 to 1.5 molar equivalent, based on the methallyl ester, of substantially anhydrous aluminum chloride, to obtain an aralkyl ester selected from the class consisting of $\beta,\beta$-dimethylphenethyl benzoate and $\beta,\beta$-dimethylphenethyl acetate.

The method is peculiarly suited to the production of $\beta,\beta$-dimethylphenethyl benzoate. It is obtained, according to the nivention, in yields of 84% or more of theory, and gives upon hydrolysis a $\beta,\beta$-dimethylphenethyl alcohol of such purity that it can be used, without tedious purification, for the production of the $\beta,\beta$-dimethylphenethyl dialkanoate functional fluids of my above-mentioned copending patent application. The by-product potassium benzoate is readily removed by filtration and can be used for making fresh methallyl benzoate for use in the present process. The invention thus provides also a method of preparing $\beta,\beta$-dimethylphenethyl alcohol which comprises contacting methallyl benzoate with benzene as described above to obtain $\beta,\beta$-dimethylphenethyl benzoate and heating the $\beta,\beta$-dimethylphenethyl benzoate, preferably, at reflux, with a hydrolyzing agent selected from the class consisting of aqueous alkali metal hydroxide and carbonate to obtain $\beta,\beta$-dimethylphenethyl alcohol.

Methallyl acetate also reacts with benzene according to the invention, giving from say 60% to 70% of the theoretical yield of $\beta,\beta$-dimethylphenethyl acetate. Compared to allyl acetate, the methallyl acetate is thus unexpectedly reactive, and $\beta,\beta$-dimethylphenethyl alcohol can be prepared, also economically, by starting with methallyl acetate, reaching it with benzene in the presence of aluminum chloride to give $\beta,\beta$-dimethylphenethyl acetate and hydrolyzing it to the alcohol as in the case of the benzoate.

In preparing either the $\beta,\beta$-dimethylphenethyl benzoate or acetate one may proceed substantially in the same manner. Preferably, the methallyl benzoate or acetate is contacted with the benzene in the presence of a quantity of substantially anhydrous aluminum chloride which is in a slight molar excess with respect to the ester, say, in a quantity which is from 1.05 to 1.5 moles and preferably of from 1.05 to 1.3 moles of aluminum chloride per mole of the ester reactant. Since formation of the $\beta,\beta$-dimethylphenethyl acetate or benzoate involves the addition of one mole of benzene at the olefinic double bond of ester reactant, the benzene and the methallyl acetate or benzoate are advantageously used in equimolar proportions. However, an excess of benzene can conveniently serve as diluent. Extraneous diluents may be used, of course, instead of benzene, e.g., there may be employed such inert organic liquids as ethyl ether, carbon tetrachloride, carbon disulfide, etc. Conveniently, for ease in isolation of product, benzene is used. Contact of the methallyl benzoate or acetate with the benzene in the presence of the aluminum chloride is preferably effected at temperatures which may be from, say −5° C. to ambient. Since the reaction is generally exothermic, heating is not required. Temperatures of from 0° C. to 20° C. are preferred. Reaction takes place readily; hence, gradual contact of the reactants is generally useful. For example, the methallyl compound, if desired in the presence of a diluent, is added dropwise to benzene containing aluminum chloride; or a mixture of benzene and aluminum chloride is added to the methallyl compound which may or may not be admixed with an inert diluent or solvent. The aluminum chloride need not be originally present in molar excess, i.e., as reaction progresses, the required total quantity of catalyst may be added portionwise to the reaction mixture. Completion of the reaction is readily evidenced by noting cessation in temperature rise and/or the formation of a clear, homogenous solution. After all of the reactant materials and catalyst have been mixed together, they may be stirred for awhile if the reaction appears to be incomplete, but generally, long stirring is not required and may be even detrimental, since the presence of uncomplexed catalyst may lead to undesired side reactions.

A preferred mode of operation is as follows: A methallyl ester selected from the class consisting of methallyl benzoate and methallyl acetate is gradually contacted with from 1.05 to 1.30 molar equivalents of substantially anhydrous aluminum chloride in a quantity of benzene sufficient to provide an equimolar proportion of benzene to methallyl benzoate and to serve as reaction diluent, at a temperature of from 0° C. to 20° C. and the $\beta,\beta$-dimethylphenethyl benzoate or acetate is recovered from the resulting reaction product. Advantageously, a solution of the methallyl acetate in benzene is added to a mixture of aluminum chloride and benzene. The product ester is readily recovered from the reaction mixture by isolating procedures which are customarily employed in Friedel-Crafts reactions, i.e., the reaction mixture is hydrolyzed, e.g., by pouring onto an ice-water mixture and washed to remove hydrochloric acid which results from the hydrolysis. The organic material is separated either by stratification or solvent extraction, i.e., with ether, and the $\beta,\beta$-dimethylphenethyl benzoate or acetate is obtained from the organic material by isolation methods known to those skilled in the art, e.g., fractional distillation or crystallization. Generally, the washed, crude reaction product is merely allowed to stratify, and the organic layer is decanted and fractionally distilled, benzene being removed at atmospheric pressure and the ester product under partial vacuum.

The use of anhydrous aluminum chloride, rather than of other Friedel-Crafts metal halide catalysts appears to be neecssary for obtaining good yields of the $\beta,\beta$-dimethylphenethyl esters from the corresponding methallyl esters and benzene. For example, ferric chloride does not catalyze the reaction. Also, contrary to numerous prior art teachings of the activating effect of hydrogen chloride in Friedel-Crafts addition reactions, the use of gaseous hydrogen chloride in this aluminum-chloride-catalyzed reaction appears to be of no advantage. Thus, in reactions conducted with methallyl acetate and benzene several runs were made in which hydrogen chloride was passed into the reaction mixture either initially or throughout the gradual or dropwise addition of a benzene solution of methallyl acetate to a mixture of benzene and aluminum chloride; but there appeared to be no significant effect which could be referred to this particular procedure. Good yields of either the $\beta,\beta$-dimethylphenyl acetate or benzoate are obtainable whether or not hydrogen chloride is used.

The invention is further illustrated by, but not limited to, the following examples.

EXAMPLE 1

Methallyl benzoate was prepared by adding 421.7 g. (3 moles) of benzoyl chloride dropwise, to a solution of 238 g. (3.31 moles) of methallyl alcohol and 260 g. (3.30 moles) of pyridine in benzene at about 20° C., heating the resulting mixture up to 76° C. within 3 hours, diluting the cooled product with water, extracting with ether and washing the extract to neutral with dilute mineral acid and water, drying the washed material over sodium sulfate and finally distilling to give 488 g. (92.8% theoretical yield) of the methallyl benzoate, B.P. 66–67° C./0.125 to 0.15 mm., $n_D^{25}$ 1.5130.

Calcd. for $C_{11}H_{12}O_2$: C, 74.97%; H, 6.86%. Found: C, 74.74%; H, 6.94%.

Conversion of the methallyl benzoate to $\beta,\beta$-dimethylphenethyl benzoate was conducted as follows: To a cooled (5° C.) mixture consisting of 337 g. (2.52 moles) of substantially anhydrous aluminum chloride in 1563 ml. of benzene there was added dropwise, during 50 minutes, a mixture consisting of 437.5 g. (2.49 moles) of methallyl benzoate and 313 ml. of benzene. The whole was stirred at 5°–7° C. for 20 minutes and then poured onto ice. After washing the organic material to free it of acid it was dried over magnesium sulfate and the benzene was distilled off. Fractionation of the residue through a 42″

Vigreux column at a 2:1 reflux ratio gave 45 g. of a fraction, B.P. 88° C./30 mm. to 137° C./0.45 mm. which gave 4 g. of the crystalline β,β-dimethylphenethyl benzoate upon cooling, 45 g. of a fraction B.P. 136° C./0.30 mm. to 138° C./0.25 mm. which gave 30 g. of the same crystals, and 501 g. of a fraction B.P. 138° C./0.25 mm., $n_D^{25}$ 1.5510–2, which solidified to the crystalline β,β-dimethylphenethyl benzoate. There was thus obtained a total of 535 g. (84.4% theoretical yield) of the β,β-dimethylphenethyl benzoate. Upon substantially quantitative (504 g. from the 535 g.) crystallization from hexane, it melted at 39–40° C. and analyzed 79.91% carbon and 7.02% hydrogen as against 80.28% and 7.13%, the respective calculated values.

The benzoate was hydrolyzed to β,β-dimethylphenethyl alcohol as follows: A mixture consisting of 504 g. (1.98 mole) of said recrystallized β,β-dimethylphenethyl benzoate, 1500 ml. of absolute ethanol, 200 ml. of water and 200 ml. of aqueous potassium hydroxide containing 155.5 g. (2.5 moles) of KOH, was refluxed for 10 hours and filtered to remove by-product potassium benzoate. After removing the alcohol by distillation, the residue was extracted with ether and the extract washed to neutral and dried. Ether was then removed from the dried product and the residue was distilled through a Todd 42″ column to give 271 g. (91.3% theoretical yield) of the substantially pure β,β-dimethylphenethyl alcohol, B.P. 124–125° C./18 mm.

The β,β-dimethylphenethyl alcohol thus obtained was condensed with either 3,3-dimethylglutaric anhydride to give bis(β,β-dimethylphenyl) 3,3-dimethylglutarate or with azelaoyl chloride to give bis(β,β-dimethylphenethyl) azelate, substantially as described in the above-mentioned, copending Blake application. Both the dimethylglutarate and the azelate were liquid esters which possessed good stability to oxygen at high temperatures and which did not decompose below at least 500° F.

EXAMPLE 2

Operating substantially as described in Example 1 for the preparation of β,β-dimethylphenethyl benzoate, methallyl acetate, B.P. 122° C., $n_D^{25}$ 1.4105, was reacted with benzene, using as in the benzoate run, a slight excess of aluminum chloride based on the acetate (1.07:1.00 molar ratio). There was thus obtained a 67% theoretical yield of product, B.P. 134° C./20 mm, $n_D^{25}$ 1.4964 which was determined by nuclear magnetic resonance analysis to consist of about 98% of the desired product, i.e., β,β-dimethylphenethyl acetate. Material boiling above this cut had a much higher refractive index and that which boiled below amounted to only about 7% by weight of the 134° C./20 mm. cut and had a 54° C. boiling range. Decreasing the quantity of aluminum chloride to 0.54 mole per mole of methallyl acetate, gave only a 26% yield of product, B.P. 130–132° C./20 mm., with the fore-run boiling at a temperature which indicated it to be essentially unreacted material. In two subsequent runs, in each of which there was used 1.12 moles of aluminum chloride per mole of methallyl acetate and the reaction mixture was stirred for about 30 minutes, in one case at 30° C. and in another case at 5–7° C., there was obtained in both instances about a 67% yield of the β,β-dimethylphenyl acetate. Hydrolysis of the thus obtained β,β-dimethylphenethyl acetates by heating with aqueous potassium hydroxide as in Example 1 gave β,β-dimethylphenethyl alcohol, B.P. 124° C./20 mm. Reaction of this alcohol with a dicarboxylic acidic compound, e.g., azelaoyl chloride or dimethylglutaric anhydride, gave liquid dialkanoates of functional fluid utility.

It is to be understood that although the invention has been described with specific reference to particular embodiments thereof, it is not to be so limited since changes and alterations therein may be made which are within the full intended scope of this invention as defined by the appended claims.

What I claim is:

1. The method which comprises contacting a methallyl ester selected from the class consisting of methallyl benzoate and methallyl acetate with benzene at a temperature of from −5° C. to 30° C. in the presence of an inert, organic liquid diluent and of from 1.05 to 1.5 molar equivalents, based on the methallyl ester, of substantially anhydrous aluminum chloride, to obtain an aralkyl ester selected from the class consisting of β,β-dimethylphenethyl benzoate and β,β-dimethylphenethyl acetate.

2. The method defined in claim 1, further limited in that the methallyl ester is methallyl benzoate, benzene is the diluent and the aralkyl ester is β,β-dimethylphenethyl benzoate.

3. The method defined in claim 1, further limited in that the methallyl ester is methallyl acetate, benzene is the diluent, and the aralkyl ester is β,β-dimethylphenethyl acetate.

4. The method which comprises gradually contacting methallyl benzoate with from 1.05 to 1.30 molar equivalents, based on the methallyl benzoate, of substantially anhydrous aluminum chloride in a quantity of benzene sufficient to provide an equimolar proportion of benzene to methallyl benzoate and to serve as reaction diluent, at a temperature of 0° C. to 20° C., and recovering β,β-dimethylphenethyl benzoate from the resulting reaction mixture.

5. The method which comprises gradually contacting methallyl acetate with from 1.05 to 1.30 molar equivalents, based on the methallyl acetate, of substantially anhydrous aluminum chloride in a quantity of benzene sufficient to provide an equimolar proportion of benzene to methallyl acetate and to serve as reaction diluent, at a temperature of 0° C. to 20° C., and recovering β,β-dimethylphenethyl acetate from the resulting reaction mixture.

References Cited

Thomas: Anhydrous Aluminum Chloride in Organic Chemistry, Reinhold, New York, 1941, pp. 477–479.

LORRAINE A. WEINBERGER, *Primary Examiner.*

T. L. GALLOWAY, *Assistant Examiner.*